United States Patent
Sciberras et al.

(10) Patent No.: US 11,042,257 B1
(45) Date of Patent: Jun. 22, 2021

(54) TRANSLATING APPLICATION RESOURCES AND INSPECTING THE FUNCTIONALITY OF THE RESOURCE TRANSLATIONS

(71) Applicant: Parallels International GmbH, Schaffhausen (CH)

(72) Inventors: Shawn Roderick Sciberras, Sliema (MT); Paul Gafa, Sliema (MT); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 284 days.

(21) Appl. No.: 15/369,703

(22) Filed: Dec. 5, 2016

(51) Int. Cl.
*G06F 3/0481* (2013.01)
*G06F 8/38* (2018.01)
*G06F 11/36* (2006.01)

(52) U.S. Cl.
CPC .............. *G06F 3/0481* (2013.01); *G06F 8/38* (2013.01); *G06F 11/3668* (2013.01)

(58) Field of Classification Search
CPC ...... G06F 11/3668; G06F 3/0481; G06F 8/38; G06F 17/289
See application file for complete search history.

(56) References Cited

U.S. PATENT DOCUMENTS

| | | | | |
|---|---|---|---|---|
| 9,117,026 B1* | 8/2015 | Liu | ...................... | G06F 11/3668 |
| 2002/0111787 A1* | 8/2002 | Knyphausen | .......... | G06Q 10/10 |
| | | | | 704/2 |
| 2006/0217954 A1* | 9/2006 | Koyama | ................. | G06F 40/58 |
| | | | | 704/2 |
| 2008/0155390 A1* | 6/2008 | Karim | ................... | G06F 17/212 |
| | | | | 715/208 |
| 2008/0201696 A1* | 8/2008 | Atkin | .................. | G06F 11/3672 |
| | | | | 717/137 |
| 2013/0055117 A1* | 2/2013 | Sahibzada | ................. | G06F 8/38 |
| | | | | 715/762 |
| 2016/0259819 A1* | 9/2016 | Smith | ............... | G06F 17/30011 |

* cited by examiner

*Primary Examiner* — Stephen S Hong
*Assistant Examiner* — Ahamed I Nazar
(74) *Attorney, Agent, or Firm* — Lowenstein Sandler LLP (57) ABSTRACT

A processing device identifies an application that is in a first language and has a first binary resource file that includes first resource data for a first set of resources of the application in the first language, determines that the application is translated into a second language and has a second binary resource file that includes second resource data for a second set of resources of the application in the second language, determines differences between functionality of the second set of resources of the application in the second language and functionality of the first plurality of resources of the application in the first language based on the first binary resource file and the second binary resource file, and modifies one or more of the second plurality of resources of the application in the second language based on at least one of the differences between the functionality of the second plurality of resources and the functionality of the first plurality of resources of the application.

20 Claims, 5 Drawing Sheets

FIG. 5 ary resource file. The application can be translated into
TRANSLATING APPLICATION RESOURCES AND INSPECTING THE FUNCTIONALITY OF THE RESOURCE TRANSLATIONS

TECHNICAL FIELD

Aspects and implementations of the present disclosure relate to application resources, and more specifically, translating application resources and inspecting the functionality of the resource translations.

BACKGROUND

In computer program development, computer program developer team members submit source code for the application being developed, and an attempt to produce a build is made with each significant source code change. A build is executable code, which has been successfully created and tested, for an application. An application can include a graphical user interface (GUI), which may include windows. Each window can have one or more UI resources, such as icons, bitmaps, dialogs, menus, strings, etc. for the application. The resources for the application can be defined in a resource-definition file, which can be compiled into a binary resource file. The application may be offered to end-users in multiple languages. The application can be initially developed for a base language and a build that consists of an application binary file for the application in the base language can be created. The application can be translated into other languages and there is generally a resource-definition file for each language that is supported by the application. When a change is made to the resources, the change is to be replicated to all of the resource-definition files.

Traditional resource systems test the resource-definition files to ensure that the translations of the resources (e.g., strings) are correct and not missing. Conventional techniques generally have no means of determining whether the functionality of the translated resources is different from the functionality of the resources in the base language when presented in an application window. The traditional use of resource-definition files generally provides limited quality assurance capabilities, and can overburden computing resources. Typically, strings in the resource-definition files are manually replaced with their respective translations. Extraneous computing resources may become limited and unavailable as each resource-definition file for a translated language is being manually compared to the resource-definition file for the base language to determine if resources and/or translations are missing.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to technology for translating application resources and modifying the translated resources if the translated resources function differently than the base resources. An application can include a graphical user interface (GUI), which may include windows. The windows can have UI resources (e.g., icons, bitmaps, dialogs, menus, strings) for the application. The resources for the application can be defined in a resource-definition file, which can be compiled into an executable binary resource file. The application can be initially developed for a base language. "Base language" is also referred to hereinafter as "primary language". The application may be offered to end-users in multiple languages and there can be a binary resource file for each language that is supported by the application. When a change (e.g., new resource, modified resource) is made to the resources in the primary language, the change is to be replicated to all of the binary resource files for the supported languages.

Traditional resource techniques test resource-definition files, which lack the capability to test the visual features of the translated resources. The testing of resource-definition files generally does not include determining whether the functionality of a translated resource, during the presentation of the translated resource in a GUI, is different from the functionality of the resource in the base language. For example, some conventional techniques cannot determine whether a translated string fits within a corresponding user interface control (e.g., a button) or if the translated string in the corresponding control is overlapping another user interface control.

Aspects of the present disclosure address the above and other deficiencies by providing a resource inspection system that can determine whether translated resources are functioning as expected (i.e., having the same functionality of resources as defined by a primary binary resource file for a primary language). In particular, the resource inspection system executes the binary resource file at runtime, and inspects the functionality of the translated resource from the executed binary resource file, rather than inspecting the resource-definition file, to provide visual analysis to detect potential visual functional differences that may affect the operation of the application. When visual differences are discovered, the resource inspection system can automatically modify the binary resource files to address (e.g., remove) the visual differences. For example, the resource inspection system may determine that a translated string is visually functioning differently than the string in the base language because the translated string does not fit within a corresponding user interface control (e.g., button). The resource inspection system may automatically (i.e., without user interaction) edit the binary resource file for the translated string to ensure that the translated string fits within the user interface control. The technology disclosed herein is advantageous because it enhances resource inspection by including the examination of visual functionality and visual features of resources of an application being translated, which have traditionally been overlooked. In addition, changes in the visual functionality and visual features of the application resources, which resulted from the translation, are identified and automatically addressed, thereby ensuring proper operation of the translated application and elimination of the manual correction process.

Figure 1:
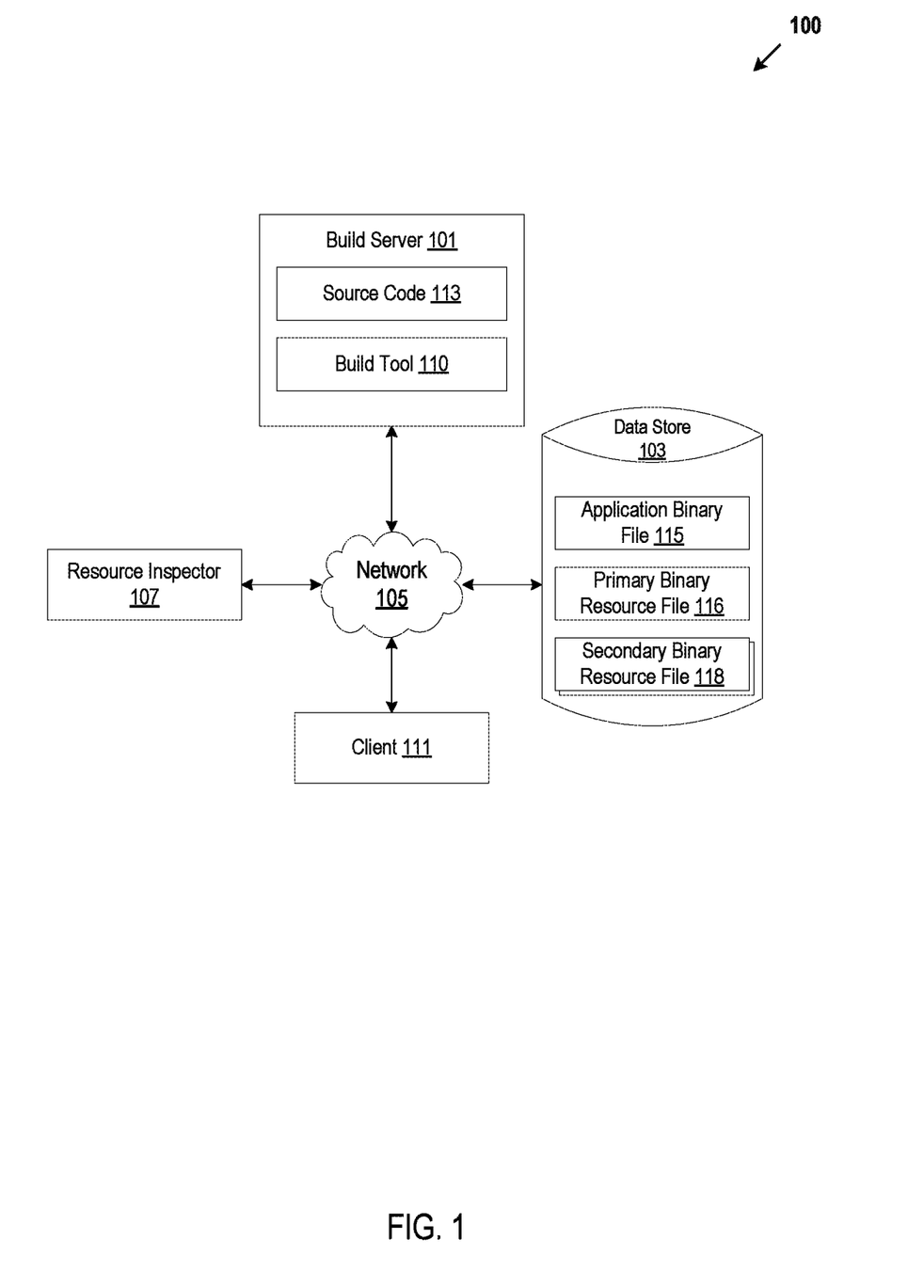
FIG. 1 illustrates an example of system architecture for automatically translating application resources into another language, inspecting translated resources for functional differences, and modifying the functionality of the translated resources to address the functional differences, in accordance with one implementation of the disclosure.

FIG. 1 is an example of system architecture 100 in which implementations of the present disclosure can be implemented. The system architecture 100 can provide resource translation and inspection services for automatically removing differences in the functionality of UI resources of an application that translated into multiple human (natural) languages, and automatically translating the UI resources of the application, as needed. The system architecture 100 can include a build server 101 for running the sets of operations for providing builds. The builds can be for source code 113 of the application that is being developed.

The application can be any type of application including, for example, a web application, a desktop application, a browser application, etc. The application can be a messaging application, a video application, a social networking application, a video sharing application, a photo sharing application, a chat application, and a mobile application of a content provider or any combination of such applications. The application can be a computationally large or data-intensive application, such as a forecasting application, a modeling application, a data analysis application, etc. The application can be a real-time application. The term "real-time" indicates that a transmission of a user communication from sender to receiver and/or receipt of the user communication by the receiver is made within a specified time constraint (e.g., under 50 microseconds). The build server 101 can be hosted on a computing device such as a server computer, a desktop computer, a portable computing device such as, and not limited to, netbooks, laptop computers, and the like.

Users, such as computer program developer team members, can submit source code 113 to the build server 101 from clients 111 via network 105 to merge the submitted source code 113 with a shared mainline code base that is being stored and maintained by the build server 101. A client 111 (client machine) can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 can be a private network (e.g., a local area network (LAN), a wide area network (WAN), intranet, or other similar private networks) or a public network (e.g., the Internet).

Users can submit source code 113 to the build server 101 on a daily (or more frequent) basis, and request a build for the submission. A build tool 110 can execute a set of operations to provide the build of the mainline code base. A build is executable code (e.g., application binary file 115), which has been successfully created and tested, for an application. The application may be offered to end-users in multiple human (natural) languages (e.g., English, Portuguese, French, Dutch, Italian, Russian, Spanish, Mandarin, Cantonese, Japanese, Korean, etc.). The application can be initially developed for a primary language. The build server 101 can generate a build that consists of an application binary file 115 for the application in the primary language. The application binary file 115 can be stored on a data store 103 that is coupled to the build server 101. In one implementation, the data store 103 is local storage of the build server 101. In another implementation, the data store 103 is coupled to the build server 101 via network 105.

Data store 103 can be a memory (e.g., random access memory), a drive (e.g., a hard drive, a flash drive), a database system, or another type of component or device capable of storing data. Data store 103 can include multiple storage components (e.g., multiple drives or multiple databases) that may span multiple computing devices (e.g., multiple server computers).

An application can include a graphical user interface (GUI). The GUI can include one or more windows. Each window can have one or more UI resources (hereinafter referred to resources or resource). A resource is binary data that can be added to the executable file (e.g., application binary file 115) of the application. The binary data for the resources can describe UI elements, such as cursors, icons, bitmaps, dialogs, dialog boxes, menus, strings, enhanced metafiles, fonts, accelerator tables, message-table entries, window parameters, tabs, string-table entries, and/or version information for the application.

The resources for the application can be defined in a resource-definition file. The resource-definition file can include resource-definition statements that describe the resources (e.g., cursors, icons, bitmaps, dialogs, dialog boxes, fonts, menus, etc.) for the application. The resource-definition file can be a text file. The build tool 110 can compile the resource-definition file to create a binary resource file (e.g., primary binary resource file 116). The build tool 110 can link the binary resource file (e.g., primary binary resource file 116) to the application's executable file (e.g., application binary file 115), such that the application can load its resources at runtime as needed.

For localizing the application to particular natural languages, there can be a primary binary resource file 116 for the primary language, and a secondary binary resource file 118 for each secondary language that is supported by the application. For example, the primary language may be English and the application can be supported in one or more secondary languages (e.g., Portuguese, French, Dutch, Italian, Russian, Spanish, Mandarin, Cantonese, Japanese, Korean, etc.). At runtime, the values from the binary resource files (e.g., primary binary resource file 116, secondary binary resource file 118) can be retrieved based on the language context of the application. A binary resource file (e.g., primary binary resource file 116, secondary binary resource file 118) can include a number of resource entries. Each entry can include a resource header and the information for that resource. A resource header can include a resource type and a resource name, as described in greater detail below in conjunction with FIG. 3.

The system architecture 100 can include a resource inspector 107 to inspect the functionality of the resources defined by the secondary binary resource files 118 to ensure that the application does not have runtime issues which may cause the application to crash (i.e., not operate, stop operating). The resource inspector 107 can be hosted on a computing device, such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. In one example, the resource inspector 107 may be hosted on the same computing machine that hosts the build server 101.

The resource inspector 107 can receive the secondary binary resource file 118 from the build server 101 as input and evaluate the secondary binary resource file 118 to determine whether the functionality of the translated resources of the application does not substantially change when compared to the functionality of the resource in the base language. The resource inspector 107 can determine whether a change is substantial using one or more criteria that are based on the primary binary resource file 116. The resource inspector 107 can evaluate the secondary binary resource file 118 to determine whether there are any functional differences between translated resources and resources in a primary language while the application is running.

The functional differences can be either critical or non-critical. A critical difference in how a resource is functioning is a difference that can prevent the application from operating (e.g., can cause the application to crash). The resource inspector 107 can label a critical difference as an error. A non-critical difference does not prevent the application from operating. The non-critical difference can be related to a feature of a translated resource (e.g., incorrect location of a dialog box in the GUI of the application, translated string is outside a UI control boundary, font type of a translated string make the translated string incomprehensible). The resource inspector 107 can label a non-critical difference as a warning.

The resource inspector 107 can compare the functionality of the translated resources defined by the secondary binary resource file 118 and defined by the execution of the secondary binary resource file 118 to the functionality of the resources defined by the primary binary resource file 116 and defined by the execution of the primary binary resource file 116, as described in greater detail below in conjunction with FIG. 2 and FIG. 3. The resource inspector 107 can check for visual differences, such as, for example, whether text resources are visible (e.g., fully visible) and are not being covered by other UI elements (e.g., UI controls) compared to the text resources in the primary language, and whether image resources are in similar locations in the GUI as those of the images in the primary languages.

The resource inspector 107 can modify one or more translated resources based on at least some differences between the functionality of the translated resources and the functionality of the resources in the primary language, as described in greater detail below in conjunction with FIG. 2. The resource inspector 107 can automatically make one or more modifications to the secondary binary resource file 118 to address (e.g., remove) an error or a warning. For example, the resource inspector 107 can modify a location of a translated UI control resource in the GUI in the secondary binary resource file 118 to match the location of the corresponding UI control resource in the GUI in the primary language. In another example, the resource inspector 107 automatically make one or more modifications to a resource-definition file to address (e.g., remove) an error or a warning, and request the build tool 110 to create a new secondary binary resource file 118. The resource inspector 107 can perform another inspection of the functionality of the translated resources using the modified and/or new secondary binary resource file 118 to determine if the difference still exists.

The resource inspector 107 can also provide notifications of any differences (e.g., errors, warnings) that the resource inspector 107 may discover during inspection. The notifications can be, for example, text files, messages, etc., as described in greater detail below in conjunction with FIG. 2. In one implementation, the notifications include a visual representation of a visual characteristic of a translated resource that is functioning differently than the corresponding resource in the primary language.

The resource inspector 107 can determine, as part of the inspection, whether the resources of the application in the primary language are missing any translations of the resources in the secondary language, as described in greater detail below in conjunction with FIG. 4. In one implementation, the resource inspection 107 can automatically update the application to include any missing translations of the resources. The resource inspection 107 can perform additional inspection(s) of the functionality of the translated resources in the updated application.

If changes have been made to the resources in the resource-definition file for a secondary language, the resource inspection 107 can request the build tool 110 to update and/or create a new secondary binary resource file 118, and the resource inspection 107 can perform another inspection of the functionality of the translated resources based on the new or updated secondary binary resource file 118. The resource inspection 107 can perform additional inspections of the functionality of the translated resources in a secondary language until there are no errors (i.e., critical differences).

In one implementation, when the resource inspection 107 determines that the functionality of the resources in a secondary language does not have any critical differences (i.e., no functional errors are found), the resource inspection 107 can generate a dictionary of the translations of the resources, as described in greater detail below in conjunction with FIG. 2.

Figure 2:
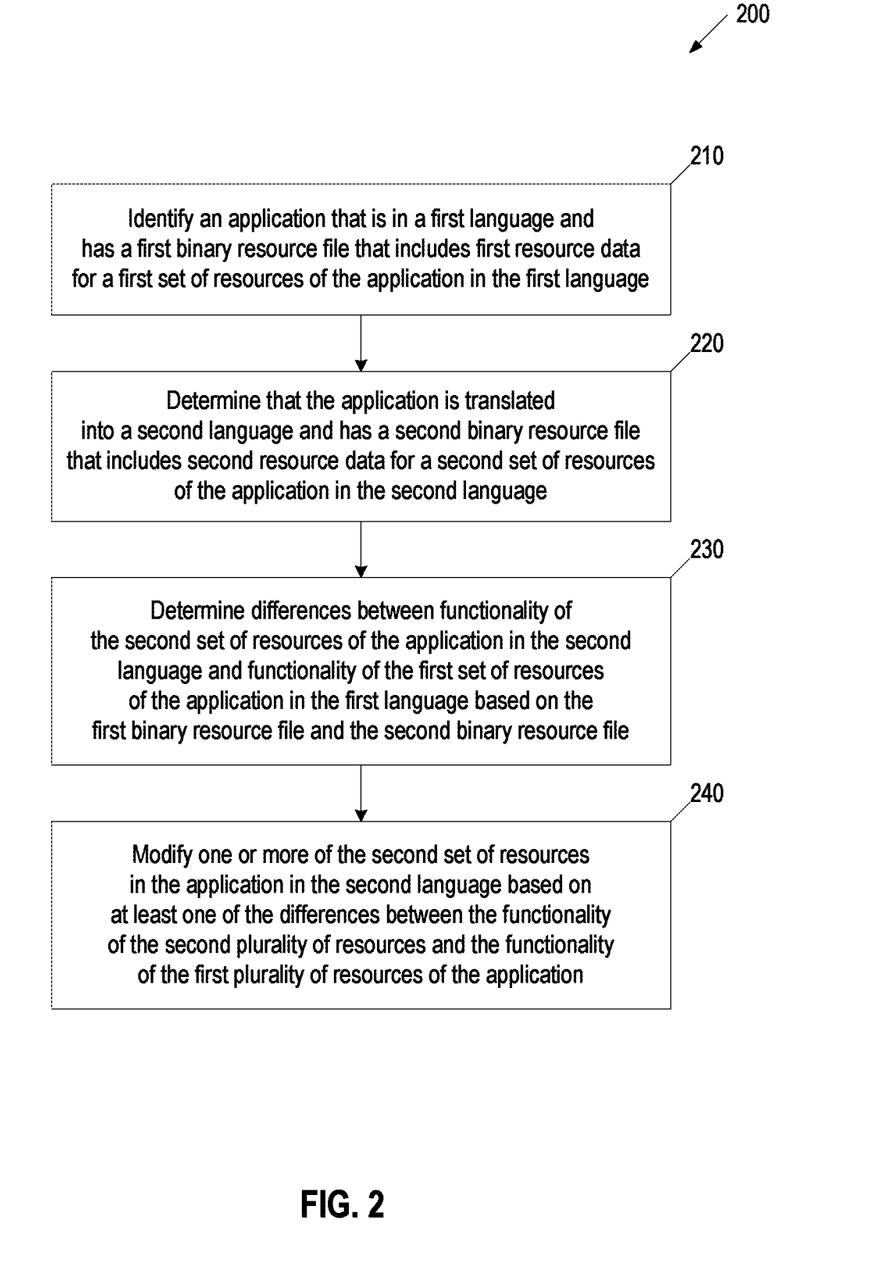
FIG. 2 depicts a flow diagram of a method for determining differences between functionality of translations of application resources in various natural languages, in accordance with one implementation of the present disclosure.

FIG. 2 depicts a flow diagram of a method 200 for determining differences between functionality of translations of application resources in various natural languages, in accordance with one implementation of the present disclosure. The method 200 is performed by processing logic that may comprise hardware (circuitry, dedicated logic, etc.), software (such as is run on a general purpose computer system or a dedicated machine), or a combination of both. In one implementation, the method is performed by a resource inspector 107 of FIG. 1, while in some other implementations one or more blocks of FIG. 2 may be performed by another machine. In one implementation, a processing device hosting the resource inspector performs method 200. In one implementation, a processing device of a server (e.g., build server 101 in FIG. 1) performs method 200.

At block 210, the processing device identifies an application that is in a first language and has a first binary resource file. The first binary resource file includes first resource data for a first set of resources of the application in the first language. The first binary resource file can be generated by a build server and may be stored in a data store that is coupled to the build server. The first language and the second language can be human (natural) languages. Examples of natural language include, for example, English, Portuguese, French, Dutch, Italian, Russian, Spanish, Mandarin, Cantonese, Japanese, and Korean, At block 220, the processing device determines that the application is translated into a second language and has a second binary resource file. The second binary resource file includes second resource data for a second set of resources of the application in the second language. The processing device can make the determination, for example, by receiving a request to inspect the functionality of the resources in the second language. The request can be user input received from a graphical user interface. The request can identify the second binary resource file. The second binary resource file can be generated by the build server and stored in the data store.

The application can have numerous resources that are defined by the first binary resource file. When the application is offered in additional languages, the resources in the first binary resource file are duplicated and translated for another language in the second binary resource file. The second binary resource file can have entries for resources, such as, cursors, icons, bitmaps, dialogs, dialog boxes, menus, strings, enhanced metafiles, fonts, accelerator tables, message-table entries, window parameters, tabs, string-table entries, and/or version information for the application.

For example, there may be an entry for a dialog box resource in the second binary resource file. The resource information in the entry for the dialog box resource can include structures that describe the format of dialog box resource. In another example, there may be an entry for a message table resource for displaying an error message or a message box. The entry can include resource information that contains the formatted text to be displayed as an error message or in a message box in the GUI of the application. The resource information can include structures that describe the format (e.g., location, etc.) of the message table resource (e.g., error message, message box).

At block 230, the processing device determines differences between functionality of the second set of resources of the application in the second language and functionality of the first set of resources of the application in the first language based on the first binary resource file and the second binary resource file. The processing device can make the determination automatically (i.e., without user interaction). The processing device can determine whether the functionality of the second set of resources does not substantially change with regards to an allowed scope defined by one or more criteria.

The processing device can determine whether the second set of resources of the application has any functional differences while running in the second language that may cause the application to crash (i.e., not operate). The functionality can be defined by attributes (e.g., accelerator key assignments, tab ordering, etc.) of the second set of resources during presentation of the second set of resources in a graphical user interface of the application. For example, a keyboard accelerator ("accelerator" or "accelerator key") is a keystroke or combination of keystrokes that generates a command message for an application. The processing device can determine whether an accelerator key that is assigned to a particular dialog in the second set of resources is different from the accelerator key that is assigned to the same dialog in the first set of resources. In another example, the processing device can determine whether a tab order is different between the first binary resource file and the second binary resource file.

The functionality can also be defined by visual characteristics of the second set of resources during presentation of the second set of resources in a graphical user interface of the application. The visual characteristics can include, for example, an appearance of a translated string, an appearance of a user interface (UI) control or a location of an image in the graphical user interface of the application, etc. The processing device can detect the visual characteristics of the second set of resources while executing the second binary resource file. For example, the processing device can determine whether a translated string fits within a corresponding user interface control or is outside a control boundary, or if the translated string within the corresponding control is overlapping another user interface control. In another example, the processing device can determine whether a dialog box has any hidden strings, which may be caused, for example, by small control sizes or overlapping UI controls. In another example, the processing device can determine whether particular font styles or control styles cause a string translation to become incomprehensible. For example, a font style that is specified in the first binary resource file may be applied to Japanese characters in the second binary resource file, which when visually presented, can cause the Japanese characters to become incomprehensible. In another example, the processing device can determine whether there are translated strings in the second set of resources that should not be translated, but should remain in the first language. In other examples, the processing device can determine whether an image is in an incorrect location based on the first set of resources.

The differences can include a critical difference that can prevent the application from operating. A critical difference can be caused by programmatic arguments. The differences can also include a non-critical difference, which is a difference with a translated resource of the application that does not prevent the application from operating. The processing device can compare the functionality of the translated resources defined by the second binary resource file to the functionality of the resources defined by the first binary resource file to detect differences that are critical differences and differences that are non-critical differences, as described in greater detail below in conjunction with FIG. 3.

At block 240, the processing device modifies one or more of the second set of resources of the application in the second language based on at least some differences between the functionality of the second set of resources and the functionality of the first set of resources of the application. In one implementation, the processing device automatically (i.e., without user interaction) modifying the second binary resource file to modify functionality of the at least one of the second set of resources to correct a non-critical issue (e.g., resource warnings). The processing device can modify resource data that defines resources (e.g., strings, accelerator keys, dialogs, icons, bitmaps, menus, etc.) in the second binary resource file to update the second binary resource file or can create a new second binary resource file. The modifications can be based on resource information in the first binary resource file. For example, the processing device may modify resource information in the second binary resource file for the location in the GUI for an image resource in the second set of resources to correct the location of the image in the GUI for the second language. The processing device can match the location for the image that is specified in the second resource binary file to the location that is specified in the first resource binary file. In another implementation, the processing device receives user input specifying one or more changes to make to the resource data in the second binary resource file for correcting a non-critical issue.

The processing device can send a notification indicating the differences between the functionality of the second set of resources and the functionality of the first set of resources of the application in the first language to a user (e.g., computer program developer, system administrator), process, build server, etc. The notification can include the number of differences, the types (e.g., critical, non-critical) of differences, the resource types associated with the differences, etc. The notification can be a message (e.g., electronic mail message, text message, system message, etc.). The processing device can generate result data for each resource type and/or for each type of difference, as described in greater detail below in conjunction with FIG. 3. The result data can be in one or more text files. The processing device can include the result data and/or a portion of the result data in a notification.

The notification can include one or more visual representations (e.g., image) illustrating an issue with a visual characteristic of at least one of the second set of resources during presentation of the second set of resources in a graphical user interface (GUI) of the application. For example, the font size that is specified in the first binary resource file can be for English characters. The font size may be applied to the second binary resource file, which may have Japanese characters, and may cause the Japanese characters to be too large to fit within a UI control in the second set of resources in the GUI, or be too small and unreadable. A notification can include an image of the Japanese characters either being too large to fit within the UI control in the second set of resources, or being too small to be readable. The processing device can capture an image of the visual characteristic during runtime to illustrate the issue with the visual characteristic in the notification.

In another example, the processing device can identify missing resource translations in the second resource binary file, as described in greater detail below in conjunction with FIG. 4. In one implementation, the processing device can automatically update the application with the missing translations in the second language, as described in greater detail in conjunction with FIG. 4. In another example, the processing device can generate a dictionary of the translations of the strings used for the resources for the application in various natural languages. In one implementation, the dictionary is a spreadsheet or a CSV file that includes a first column with row entries for each string in the first binary resource file followed by additional column and row entries for corresponding translated strings in other supported natural languages.

The processing device can iterate through at least a portion of method 300 until a threshold is met. The threshold may be, for example, that there are no critical differences (e.g., errors) found when evaluating the second binary resource file. For example, the processing device may perform block 230 and block 240 until there are no critical differences discovered. Another threshold can include a maximum number of allowed non-critical differences (e.g., warnings).

Figure 3:
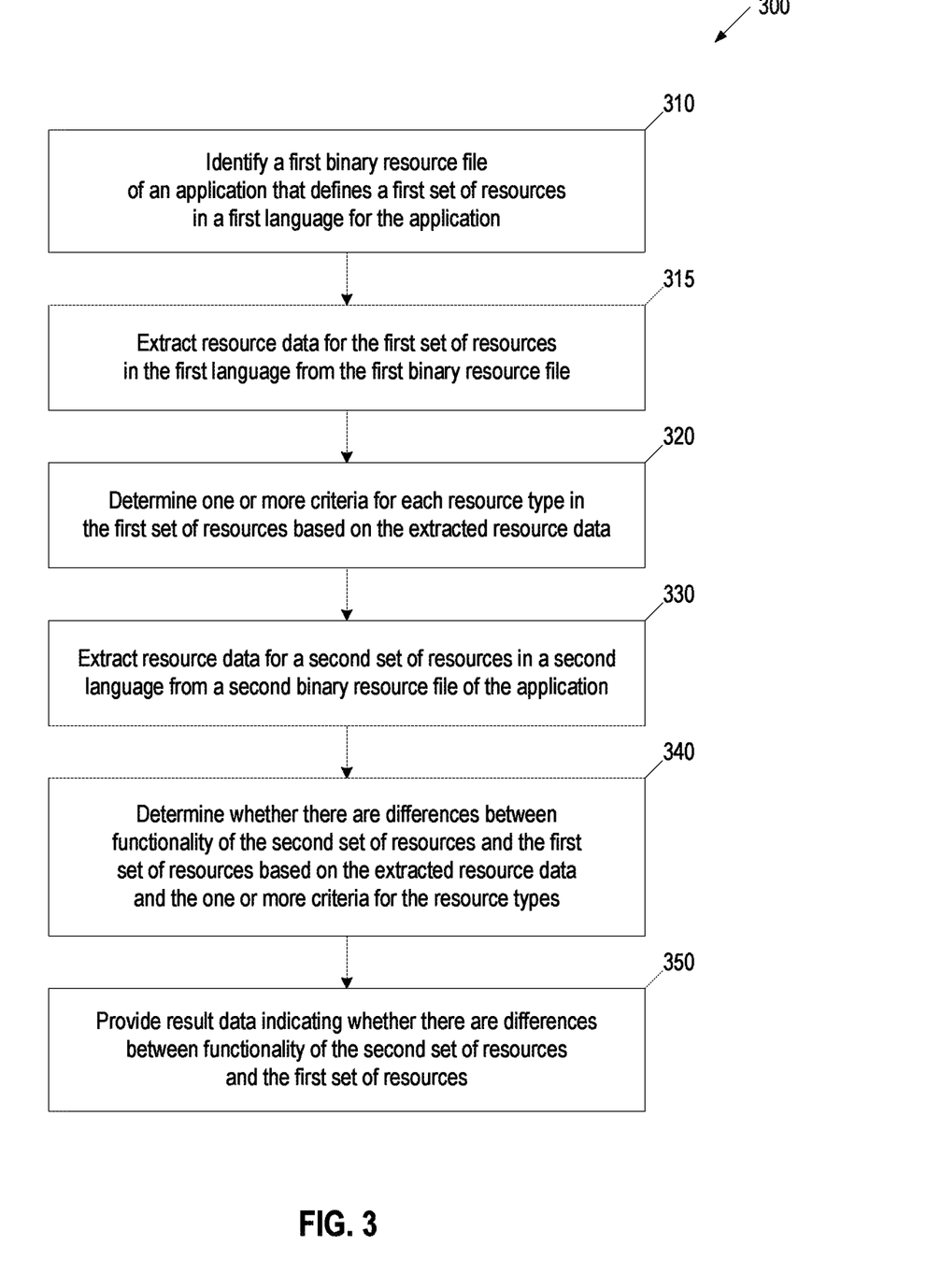
FIG. 3 depicts a flow diagram of a method for determining differences between functionality of translations of various resource types of an application in various natural languages, in accordance with one implementation of the present disclosure.

FIG. 3 depicts a flow diagram of a method 300 for determining differences between functionality of translations of various resource types of an application in various natural languages, in accordance with one implementation of the present disclosure. The method 300 is performed by processing logic that may comprise hardware (circuitry, dedicated logic, etc.), software (such as is run on a general purpose computer system or a dedicated machine), or a combination of both. In one implementation, the method is performed by a resource inspector 107 of FIG. 1, while in some other implementations one or more blocks of FIG. 3 may be performed by another machine. In one implementation, a processing device of a server (e.g., build server 101 in FIG. 1) performs method 300.

At block 310, the processing device identifies a first binary resource file of an application that defines a first set of resources in a first language for the application. The first binary resource file can include resource data that describes resources of the application in the first language. The first binary resource file can include resource entries to define the resources for the application. Each entry can include a resource header and the resource information for that resource. A resource header can include a resource type and a resource name. The resource information that defines a resource can follow the respective resource header and can be specific to each type of resource.

At block 315, the processing device extracts resource data for the first set of resources in the first language from the first binary resource file of the application. The processing device can parse the first binary resource file to search for keywords, patterns, etc., and extract resource data from the first binary resource file based on configuration data. The configuration data can specify the keywords, patterns, etc. that the processing device should search for and which resource data to extract. The configuration data can be configurable and/or user (e.g., system administrator) defined. The configuration data can be stored in a data store that is coupled to the processing device.

At block 320, the processing device determines one or more criteria for each resource type in the first set of resource based on the extracted resource data. Examples of resource types can include cursor, icon, bitmap, dialog, dialog box, font, HTML document, strings, messages, version, etc. The processing device can identify the resource types in the extracted data and retrieve the one or more criteria that corresponds to the resources types. The one or more criteria for each resource type can be stored in configuration data in a data store. The configuration data can be configurable and/or user (e.g., system administrator) defined.

For example, there may be an accelerator key resource type in the extracted data, and the processing device may determine from the configuration data that there is a criterion for the accelerator key resource type that the number of accelerator keys in a second binary resource file should be the same number as in the first binary resource file. In another example, the accelerator resource type may have another criterion that keystrokes or combinations of keystrokes that are used for all of the accelerator keys in a particular binary resource file should be the different.

At block 330, the processing device extracts resource data for a second set of resources in a second language from a second binary resource file of the application. The application may be offered in another language, and the build server may generate the second binary resource file to define the resources in the other language. The second binary resource file may be stored in the data store that is coupled to the build server. The processing device can parse the second binary resource file to search for keywords, patterns, etc., and extract resource data from the second binary resource file. The configuration data can specify the keywords, patterns, etc. that the processing device should search for and which resource data to extract.

For example, for each resource entry in the second binary resource file, the processing device may extract the resource type, resource name, and at least a portion of the resource information, which describes the resource. For example, there may be an entry for an image resource in the second binary resource file that includes resource information about the location in the GUI for the image resource, and the processing device can extract the resource type, the resource name, and the location information for the image.

At block 340, the processing device determines whether there are differences between functionality of the second set of resource and the first set of resources based on the extracted resource data and the one or more criteria. For example, the processing device may extract resource data for a string resource in the second binary resource file. The resource data may include a formatting argument, which may be a number, for the string. There may be a criterion for a string resource specifying that the formatting argument in the second binary resource file should match the formatting argument in the first binary resource file. During the translation of the resources into the second language, the number for the formatting argument for the string may have mistakenly been changed. The processing device can determine that the formatting argument extracted from the second binary resource file does not match the formatting argument in the first binary resource file, does not satisfy the criterion for the string resource, and that there is a difference in the functionality of the string resource between the second set of resources and the first set of resources.

In another example, the processing device may detect a difference in the functionality of a UI control resource between the sets of resources. In one implementation, a difference in the functionality of a UI control resource between the sets of resources can be detected using a combination of application programming interfaces (APIs) that access the UI control resource displayed in the GUI to determine whether the UI control resource functions as expected (e.g., the translated text fits in a dialog box). In an alternative implementation, the processing device can capture, during runtime of the second binary resource file, an image of one or more resources as the one or more resources are displayed in the GUI. The images to be captured can be specified by configuration data. For example, the processing device may capture a screenshot of a UI control that includes a string that is translated into Chinese characters. The extracted data can include the screenshots of the resources and the processing device can use the screenshots and the one or more criteria to determine whether there is a difference in the functionality of the resources between the sets of resources. The criterion for a UI control resource may be that a string for the UI control fits within the boundary parameters of the UI control. In one implementation, the processing device can use recognition technology (e.g., optical character recognition technology) to determine whether a string fits within boundary parameters of the UI control. The processing device may determine that the string does not fit within the boundary parameters of the UI control, does not satisfy the criterion for the UI control resource, and that there is a difference in the functionality of the UI control resource between the second set of resources and the first set of resources.

At block 350, the processing device provides result data indicating whether there are differences between functionality of the second set of resources and the first set of resources. The processing device can assign a result to each resource in the second set of resources. The results can indicate for example, whether the functionality of a particular resource in the second language was the same as or different than the corresponding resource in the first language. If the functionality of a particular resource was different, the processing device can determine whether the difference is a critical difference or a non-critical difference. The configuration data can specify the types of functional differences that are critical differences and the types that are non-critical differences. The result can identify a functional difference as an error if the difference is critical or as a warning if the difference is non-critical.

For example, the processing device may be inspecting the functionality of a string resource in the second set of resources, and may determine that the formatting argument extracted from the second binary resource file does not match the formatting argument in the first binary resource file, and does not satisfy the criterion for the string resource. The processing device can determine, for example, from the configuration data, that the incorrect formatting arguments for the string resource is a critical difference that can cause the execution of the application to crash (i.e., stop execution). The processing device can assign an error as the result for the string resource.

In another example of an error, the GUI of the application may have a window that includes three UI control elements. The first binary resource file can define an order for the three control resources. The processing device may be evaluating the functionality of the control resources, and may extract resource data for the control resources from the second binary resource file. The resource data for the translated control resources may include an order, which may mistakenly be different than the order in the first binary resource file. The criterion for the control resources may be that the control order of the second set of resources should match the control order of the first set of resources. The processing device can determine that the extracted resource data (e.g., control order) for the control resources does not satisfy the criterion for the control resources. The processing device can determine, for example, from the configuration data, that the wrong order for the control resources is a critical difference and can assign an error as the result for the control resources.

A non-critical difference is a difference that does not prevent the application from operating. The non-critical difference can be related to, for example, a feature of a translated resource. For example, a feature of an accelerator key can include the key and/or key combination assignment for the accelerator key. For example, the GUI of the application may have a window that has two accelerator keys. The first resource binary file can include resource data for the accelerator resources that specifies that the key combination "Alt+N" is assigned to "Main Name" and the key combination "Alt+S" is assigned to "Surname."

The processing device may extract resource data for the translated accelerator resources from the second binary resource file. The resource data for the translated accelerator resources may mistakenly specify different key combinations and/or assignments of the key combinations. The criterion for accelerator key resources may be that the key and/or key combination assignments are the same between the second set of resources and the first set of resources. The processing device can determine that the extracted resource data (e.g., key combinations and/or assignments of the key combinations) for the translated accelerator resources does not satisfy the criterion (e.g., the key combination "Alt+N" is assigned to "Main Name" and the key combination "Alt+S" is assigned to "Surname") for the accelerator resources, and may determine, for example, from the configuration data, that the wrong key combinations and/or assignments of the key combinations for the translated accelerator resources are non-critical differences. The processing device can assign a warning as the result for the translated accelerator resources since the wrong key combinations and/or assignments of the key combinations should not cause the application to crash (i.e., stop operating).

The processing device can generate result data for each resource type and/or for each type of failure. The result data can be in one or more text files. For example, the processing device can generate a text file that includes data for the errors found during the inspection of the functionality of the translated resources and a text file that includes data for the warnings found during the inspection of the functionality of the translated resources. In one implementation, the processing device generates text files for the errors and/or warnings by resource type. For example, the processing device may generate a text file for accelerator resource warnings, a text file for dialog resource warnings, a text file for string resource warnings, etc.

Figure 4:
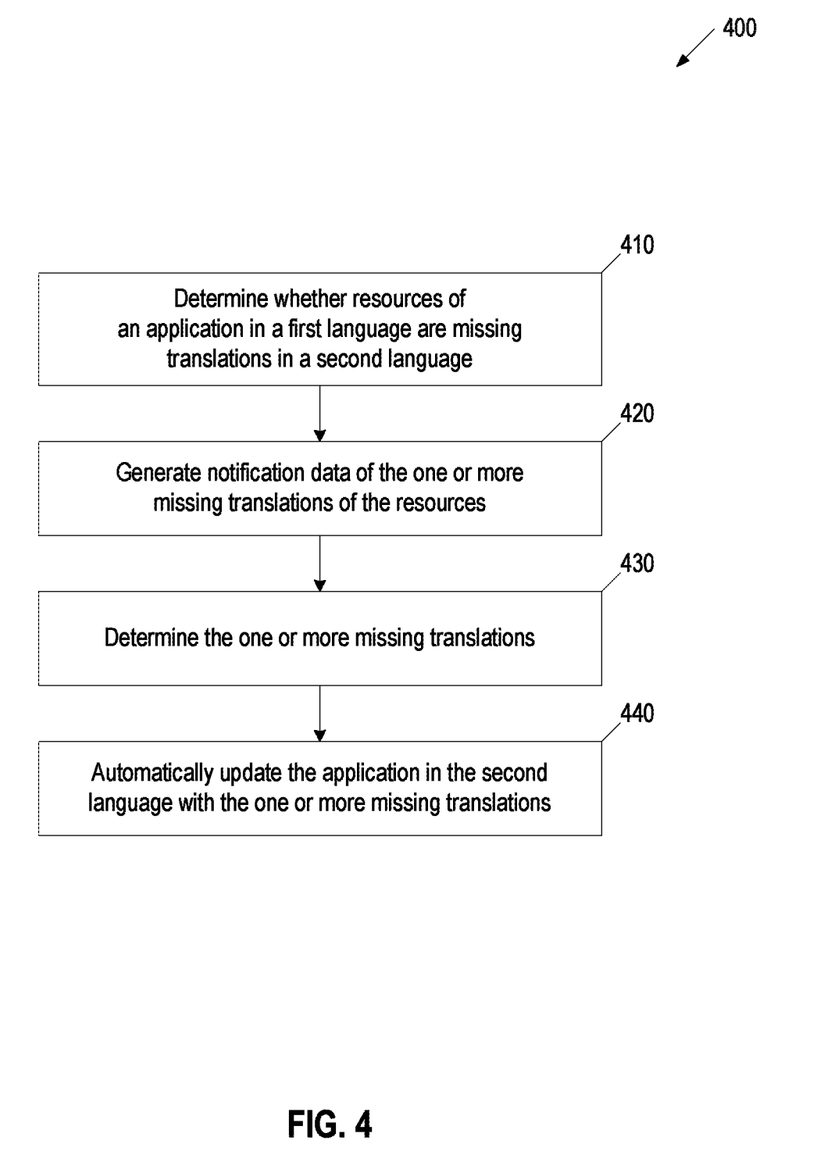
FIG. 4 depicts a flow diagram of a method for automatically translating resources of an application from first natural language to a second natural language, in accordance with one implementation of the present disclosure.

FIG. 4 depicts a flow diagram of a method 400 for automatically translating resources of an application from a first natural language to a second natural language, in accordance with one implementation of the present disclosure. The method 400 is performed by processing logic that may comprise hardware (circuitry, dedicated logic, etc.), software (such as is run on a general purpose computer system or a dedicated machine), or a combination of both. In one implementation, the method is performed by a resource inspector 107 of FIG. 1, while in some other implementations one or more blocks of FIG. 4 may be performed by another machine. In one implementation, a processing device of a server (e.g., build server 101 in FIG. 1) performs method 400.

At block 410, the processing device determines whether there are any resources of an application in a first language that are missing translations in a second language. The application can be developed for a first (e.g., base) language and may be translated into one or more second (e.g., other) languages. For example, the application may be in a first language, such as, English, and may be translated into a second language, such as, French. The application can have a first binary resource file for the application resources in English and can have a second binary resource file for the application resources in French.

The processing device can extract, from the first binary resource file, a first set of data for the resources that are to be translated into the second language (e.g., Spanish). The extracted data can include resource identifiers (e.g., resource names) for the resources, and the values that are set for the resources. For example, the processing device may extract the resource identifier "Exit_Menu" and the value "Exit" from the first binary resource file. The processing device can parse the first binary resource file to search for keywords, patterns, etc. to locate the data (e.g., resource identifiers, values) that is to be extracted for the resources that are to be translated. Examples of resources that are to be translated can include cursors, icons, bitmaps, dialogs, dialog boxes, menus, strings, enhanced metafiles, fonts, accelerator tables, message-table entries, window parameters, tabs, string-table entries, and/or version information for the application. There can be configuration data in a data store that specifies the keywords, patterns, etc. that the processing device should search for and the data that should be extracted.

The processing device can extract, from the second binary resource file, a second set of data for the resources that have already been translated into the second language (e.g., French). The extracted data can include resource identifiers (e.g., resource names) for the resources, and the values that are set for the resources. For example, the processing device may extract the resource identifier "Exit_Menu" and the value "Quitter" from the second binary resource file.

The processing device can compare the second set of extracted data to the first set of extracted data to determine whether there are any resources in the first language (e.g., English) that are missing translations in the second language (e.g., French). The processing device can detect a missing translation by comparing the resource identifiers in the second binary resource file to the resource identifiers in the first binary resource file. There may be a resource change to the application, for example, by adding a new resource o the application, and the new resource may not have been added to any of the second binary resource files. The processing device can determine whether the number of the extracted resources identifiers in the binary resource files is the same or if the second binary resource file has less than the number of extracted resource identifiers than in the first binary resource file.

If the number of extracted resource identifiers in the second binary resource file is less than the number of extracted resource identifiers in the first binary resource file, then the processing device can determine that there are one or more missing translations. The processing device can compare the resource identifiers in the second binary resource file to the resource identifiers in the first binary resource file to determine which resource identifiers are missing in the second binary resource file.

If the number of extracted resource identifiers in the second binary resource file is greater than the number of extracted resource identifiers in the first binary resource file, then the processing device can determine whether duplicate resource translations or new resource translations were mistakenly made in the second binary resource.

If the number of extracted resource identifiers in the second binary resource file is the same as the number of extracted resource identifiers in the first binary resource file, then the processing device can determine whether the resource identifiers match in the binary resource files. If the extracted resource identifiers in the second binary resource file do not match the extracted resource identifiers in the first binary resource file, the processing device can compare the resource identifiers in the binary resource files to determine which resource identifiers are missing in the second binary resource file and which resources identifiers are unnecessary in the second binary resource file.

If the extracted resource identifiers in the second binary resource file match the extracted resource identifiers in the first binary resource file, the processing device can detect a missing translation by comparing the extracted values for matching resource identifiers in the binary resource files. If a resource identifier has a value in the second binary resource file that is the same as the value for the same resource identifier in the first binary resource file, then the processing device can determine that a translation for the resource identifier has not been made. For example, the processing device may determine that the resource identifier "File_Menu" may have the value "File" in the second binary resource file and the same value "File" in the first binary resource file, and that a translation for the resource for the resource identifier "File_Menu" has not been made.

If a resource identifier has a value in the second binary resource file that is different from the value for the same resource identifier in the first binary resource file, then the processing device can determine that a translation for the resource identifier has been made. For example, the processing device may determine that the resource identifier "Exit_Menu" may have the value "Quitter" in the second binary resource file and the value "Exit" in the first binary resource file, and that a translation for the resource for the resource identifier "Exit_Menu" has been made. In one implementation, the processing device can determine whether the translation is correct. The processing device can compare the value ("Quitter") extracted from the second binary resource file to a dictionary that is stored in a data store to determine whether the value for the translation is correct. The dictionary can include correct translation values for various languages.

At block 420, the processing device generates notification data of the one or more missing translations of the resources. The notification data can be, for example, in a spreadsheet file, a comma-separated values (CSV) file, etc. A CVS file stores tabular data in plain text. The notification data can include the values of the resources in the first binary resource file that are to be translated.

At block 430, the processing device determines the one or more missing translations. The processing device can send a request to a translator for the missing translations. The request can include the notification data and a language identifier for the translations. The translator can perform the translations and the processing device can receive a translation result from the translator. The translation result can include the translations of the values of the resources in the first binary resource file that needed to be translated. The translation result can be, for example, in a spreadsheet file, a comma-separated values (CSV) file, etc.

At block 440, the processing device automatically updates the application in the second language with the one or more missing translations of the resources. The processing device can automatically modify the second binary resource file. The processing device can edit the resources in the second binary resource file to add missing resource identifiers and the corresponding translated values, for example, provided by the translator. The processing device can change values in the second binary resource file to correct translations for the resources. The processing device can remove extraneous resource identifiers and the corresponding values in the second binary resource file.

In one implementation, the processing device inspects the modified second binary resource file to determine whether there are any differences between the functionality of the updated resources in the second language with the functionality of the resource in the first language.

Figure 5:
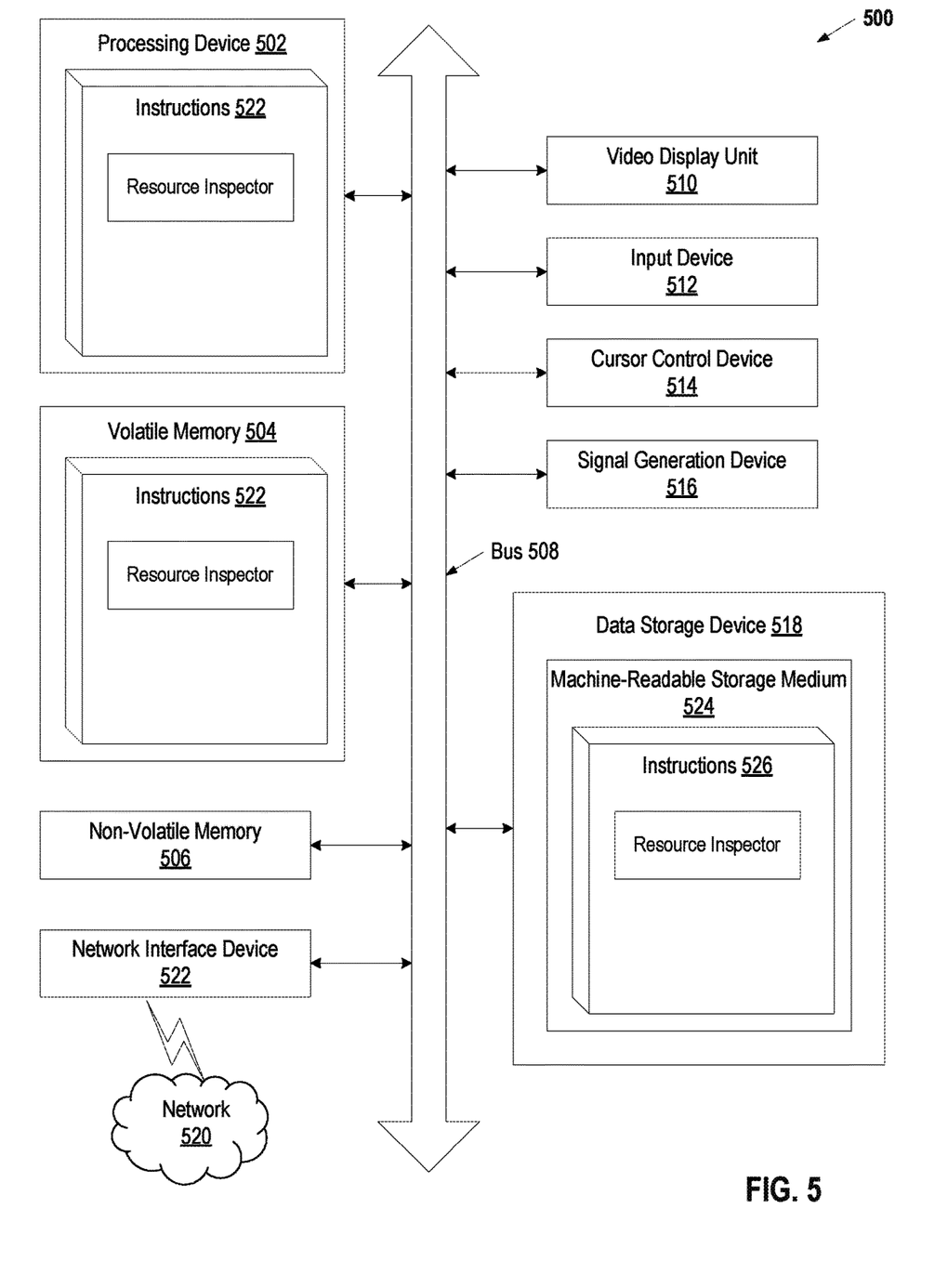
FIG. 5 depicts a block diagram of an example computing device operating in accordance with one or more aspects of the present disclosure.

FIG. 5 depicts a block diagram of a computer system operating in accordance with one or more aspects of the present disclosure. In certain implementations, computer system 500 may be connected (e.g., via a network, such as a Local Area Network (LAN), an intranet, an extranet, or the Internet) to other computer systems. Computer system 500 may operate in the capacity of a user device. Computer system 500 may operate in the capacity of a server or a client computer in a client-server environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an input device 512 (e.g., a keyboard, an alphanumeric keyboard, a motion sensing input device, touch screen), a cursor control device 514 (e.g., a mouse), and a signal generation device 516.

Data storage device 518 may include a non-transitory machine-readable storage medium 524 on which may store instructions 526 encoding any one or more of the methods or functions described herein, including instructions encoding components of resource inspector 107 and/or server 101 of FIG. 1 for implementing methods 200, 300, and 400.

Instructions 526 may also reside, completely or partially, within volatile memory 1504 and/or within processing device 502 during execution thereof by computer system 500, hence, volatile memory 504 and processing device 502 may also constitute machine-readable storage media.

While machine-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "modifying," "sending," "creating," "updating," "extracting," "providing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200, 300, 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying an application that is in a first language and has a first binary resource file comprising first resource data, the first resource data defining how a first plurality of resources of the application is displayed in the first language;
   receiving, by a resource inspector program executed by a processing device, input of a second binary resource file comprising second resource data, the second resource data defining how a second plurality of resources of the application translated from the first language into a second language is displayed in the second language;
   determining, based on the first binary resource file and the second binary resource file, by the resource inspector program executed by the processing device, one or more differences between how the second plurality of resources of the application is displayed in the second language and how the first plurality of resources of the application is displayed in the first language; and
   modifying, by the resource inspector program executed by the processing device, the second binary resource file based on the one or more determined differences.

2. The method of claim 1, wherein how the second plurality of resources is displayed in the second language is defined by visual characteristics of the second plurality of resources during presentation of the second plurality of resources in a graphical user interface of the application.

3. The method of claim 2, wherein the visual characteristics comprise at least one of an appearance of a translated string, an appearance of a user interface (UI) control, or a location of an image in the graphical user interface of the application.

4. The method of claim 1, further comprising:
   sending a notification indicating the differences between how the second plurality of resources of the application is displayed in the second language and how the first plurality of resources of the application is displayed in the first language, the notification comprising a visual representation of a visual characteristic of at least one of the second plurality of resources during presentation of the second plurality of resources in a graphical user interface of the application.

5. The method of claim 1, further comprising:
   determining that the second plurality of resources of the application in the second language is missing one or more translations of the second plurality of resources in the second language;
   determining the one or more missing translations;
   updating the application in the second language with the one or more missing translations; and
   determining whether the second plurality of resources in the updated application is still displayed differently from the first plurality of resources of the application in the first language.

6. The method of claim 1, wherein determining the differences between how the second plurality of resources of the application is displayed in the second language and how the first plurality of resources of the application is displayed in the first language comprises:
   determining a first plurality of resource types in the first binary resource file;
   determining one or more criteria for each resource type in the first binary resource file;
   extracting the second resource data for the second plurality of resources from the second binary resource file, wherein each resource in the second plurality of resources has a resource type;
   for each resource in the second binary resource file, determining whether the extracted second resource data for a respective resource satisfies the one or more criteria for the resource type of the respective resource; and
   providing result data indicating whether the second plurality of resources in the second binary resource file satisfy respective one or more criteria.

7. A non-transitory computer readable medium having instructions stored thereon that, when executed by a processing device, cause the processing device to perform operations comprising:
   identifying an application that is in a first language and has a first binary resource file comprising first resource data, the first resource data defining how a first plurality of resources of the application is displayed in the first language;
   receiving, by a resource inspector program executed by a processing device, input of a second binary resource file comprising second resource data, the second resource data defining how a second plurality of resources of the application translated from the first language into a second language is displayed in the second language;
   determining, based on the first binary resource file and the second binary resource file, by the resource inspector program executed by the processing device, one or more differences between how the second plurality of resources of the application is displayed in the second language and how the first plurality of resources of the application is displayed in the first language; and
   modifying, by the resource inspector program executed by the processing device, the second binary resource file based on the one or more determined differences.

8. The non-transitory computer readable medium of claim 7, wherein how the second plurality of resources is displayed in the second language is defined by visual characteristics of the second plurality of resources during presentation of the second plurality of resources in a graphical user interface of the application.

9. The non-transitory computer readable medium of claim 8, wherein the visual characteristics comprise at least one of an appearance of a translated string, an appearance of a user interface (UI) control, or a location of an image being in the graphical user interface of the application.

10. The non-transitory computer readable medium of claim 7, further comprising:
sending a notification indicating the differences between how the second plurality of resources of the application is displayed in the second language and how the first plurality of resources of the application is displayed in the first language, the notification comprising a visual representation of a visual characteristic of at least one of the second plurality of resources during presentation of the second plurality of resources in a graphical user interface of the application.

11. The non-transitory computer readable medium of claim 7, further comprising:
determining that the second plurality of resources of the application in the second language is missing one or more translations of the second plurality of resources in the second language;
determining the one or more missing translations;
updating the application in the second language with the one or more missing translations; and
determining whether the second plurality of resources in the updated application is still displayed differently from the first plurality of resources of the application in the first language.

12. The non-transitory computer readable medium of claim 7, wherein determining the differences between how the second plurality of resources of the application is displayed in the second language and how the first plurality of resources of the application is displayed in the first language comprises:
determining a first plurality of resource types in the first binary resource file;
determining one or more criteria for each resource type in the first binary resource file;
extracting second resource data for the second plurality of resources from the second binary resource file, wherein each resource in the second plurality of resources has a resource type;
for each resource in the second binary resource file, determining whether the extracted second resource data for a respective resource satisfies the one or more criteria for the resource type of the respective resource; and
providing result data indicating whether the second plurality of resources in the second binary resource file satisfy respective one or more criteria.

13. A system comprising:
a memory to store a first binary resource file for an application in a first language and a second binary resource file for the application in a second language, wherein the first binary resource file comprises first resource data defining how a first plurality of resources of the application is displayed in the first language and the second binary resource file comprises second resource data defining how a second plurality of resources of the application translated from the first language into a second language is displayed in the second language; and
a processing device coupled to the memory, the processing device to execute a resource inspector program to:
receive input of the second binary resource file;
determine based on the first binary resource file and the second binary resource file, differences between how the second plurality of resources of the application is displayed in the second language and how the first plurality of resources of the application is displayed in the first language; and
modify the second binary resource file based on the one or more determined differences.

14. The system of claim 13, wherein how the second plurality of resources is displayed in the second language is defined by visual characteristics of the second plurality of resources during presentation of the second plurality of resources in a graphical user interface of the application.

15. The system of claim 14, wherein the visual characteristics comprise at least one of an appearance of a translated string, an appearance of a user interface (UI) control, or an image being in a location of an image in the graphical user interface of the application.

16. The system of claim 13, wherein the processing device is further to:
send a notification indicating the differences between how the second plurality of resources of the application is displayed in the second language and how the first plurality of resources of the application is displayed in the first language, the notification comprising a visual representation of a visual characteristic of at least one of the second plurality of resources during presentation of the second plurality of resources in a graphical user interface of the application.

17. The system of claim 13, wherein the processing device is further to:
determine that the second plurality of resources of the application in the second language is missing one or more translations of the second plurality of resources in the second language; determine the one or more missing translations;
updating the application in the second language with the one or more missing translations; and
determine whether the second plurality of resources in the updated application is still displayed differently from the first plurality of resources of the application in the first language.

18. The method of claim 1, wherein modifying the second binary resource file comprises sending a request to a build tool to update the second binary resource file.

19. The non-transitory computer readable medium claim 7, wherein modifying the second binary resource file comprises sending a request to a build tool to update the second binary resource file.

20. The system of claim 13, wherein to modify the second binary resource file the resource inspector program is to send a request to a build tool to update the second binary resource file.

* * * * *